(12) United States Patent
Kuriyan

(10) Patent No.: US 8,213,392 B2
(45) Date of Patent: *Jul. 3, 2012

(54) CELLULAR-BASED COMMUNICATIONS SYSTEM AND METHOD OF USING SAME

(75) Inventor: George Kuriyan, Bridgewater, NJ (US)

(73) Assignee: MCI Communications Corporation, Basking Ridge, NJ (US)

( * ) Notice: Subject to any disclaimer, the term of this patent is extended or adjusted under 35 U.S.C. 154(b) by 2760 days.

This patent is subject to a terminal disclaimer.

(21) Appl. No.: 10/652,199

(22) Filed: Sep. 2, 2003

(65) Prior Publication Data

US 2005/0250485 A1      Nov. 10, 2005

Related U.S. Application Data

(63) Continuation of application No. 08/947,580, filed on Oct. 9, 1997, now Pat. No. 6,628,705.

(51) Int. Cl.
*H04Q 7/24*       (2006.01)

(52) U.S. Cl. ........ 370/338; 370/310; 370/466; 375/222; 455/151.2

(58) Field of Classification Search ........................ None
See application file for complete search history.

(56) References Cited

U.S. PATENT DOCUMENTS

| | | | | |
|---|---|---|---|---|
| 4,733,345 | A | * | 3/1988 | Anderson ..................... 713/155 |
| 4,992,787 | A | * | 2/1991 | Helm ......................... 340/854.8 |
| 5,454,024 | A | * | 9/1995 | Lebowitz ........................ 379/40 |
| 5,511,098 | A | | 4/1996 | Gardner |
| 5,594,943 | A | | 1/1997 | Balachandran |
| 5,729,549 | A | * | 3/1998 | Kostreski et al. ............. 370/522 |
| 5,732,074 | A | * | 3/1998 | Spaur et al. ................... 370/313 |
| 5,761,500 | A | | 6/1998 | Gallant et al. |
| 5,777,991 | A | | 7/1998 | Adachi et al. |
| 5,872,810 | A | | 2/1999 | Philips et al. |
| 5,890,057 | A | * | 3/1999 | Dutkiewicz et al. ............ 455/69 |
| 5,920,821 | A | | 7/1999 | Seazholtz et al. |
| 6,009,325 | A | | 12/1999 | Retzer et al. |
| 6,088,600 | A | * | 7/2000 | Rasmussen ................... 455/574 |
| 6,122,527 | A | * | 9/2000 | Robinson et al. ............. 455/557 |
| 6,130,898 | A | * | 10/2000 | Kostreski et al. ............. 370/522 |
| 6,418,324 | B1 | * | 7/2002 | Doviak et al. ............... 455/426.1 |
| 6,628,705 | B1 | * | 9/2003 | Kuriyan ......................... 375/220 |
| 6,934,551 | B1 | * | 8/2005 | Kuriyan ......................... 455/466 |
| 7,266,094 | B2 | * | 9/2007 | Kuriyan ......................... 370/310 |

* cited by examiner

*Primary Examiner* — Duc C Ho

(57) ABSTRACT

An apparatus and method for transmitting serial digital data across wireless modems is disclosed. In one embodiment, data is collected by a remote monitoring device and transmitted to a first Cellular Digital Packet Data ("CDPD") modem via one or more RS232 interfaces. The applications program in the first CDPD modem transmits a signal to a second CDPD modem initiating communications. The applications program in the second CDPD modem returns a signal, indicating the status of the interface. Data transmission is initiated when the status of both interfaces is established.

27 Claims, 15 Drawing Sheets

| Line | Value | Status |
|------|-------|--------|
| CTS  | High (1) Low (0) | SEND ESTABLISH ACTIVE |
| RTS  | High (1) Low (0) | SEND ESTABLISH ACTIVE |

CELLULAR-BASED COMMUNICATIONS SYSTEM AND METHOD OF USING SAME

RELATED APPLICATIONS

The present application is a continuation of U.S. patent application Ser. No. 08/947,580 filed on Oct. 9, 1997 now U.S. Pat. No. 6,628,705, entitled "Cellular-Based Communications Systems and Method of Using Same."

TECHNICAL FIELD

The present invention relates generally to a communications system and, more specifically, to an apparatus and method for implementing a communications interface protocol using existing Cellular Digital Packet Data ("CDPD") transmission equipment.

BACKGROUND

Cellular Digital Packet Data ("CDPD") is a wireless communications protocol that folds streams of data into envelopes or packets that are transmitted at very high speeds during pauses in cellular phone conversations. This permits the use of existing cellular systems as a means of data transmission. CDPD allows data files to be assembled into packets and transmitted via idle channels of existing bandwidth. Data can be transmitted at 19.2 Kbps over an enhanced cellular network. Adding CDPD to an existing analog cellular system allows cellular systems to transmit data eight times faster without the necessity of creating a completely new digital system.

In practice, packet data is transmitted in a wireless mode using the available bandwidth the Advanced Mobile Phone Service ("AMPS") which operates as the communications infrastructure for analog cellular radio. Digital cellular is referred to as D-AMPS. CDPD specifications are published through the CDPD Forum and follow OSI (Open Systems Interconnection Protocol) guidelines. CDPD technology provides connectivity up to the network layer and is an overlay system that operates on AMPS frequencies.

The RS232 serial interface provides a serial data connection between two devices over dedicated wires. The interface defines up to 26 lines between two devices. One line carries the data and the others carry signaling information. Signaling is achieved by the lines through binary states, either "ON" or "OFF." Some lines are defined for data and some for signaling. Thus, data transmission can be controlled simultaneous by both the sending device and the receiving device.

For example, the sending device can query the receiving device as to whether it is ready to receive data by setting the signal high on a line called Ready To Send ("RTS"). The receiving device can, in turn, reply that it is ready to receive data by setting the signal high on the Clear To Send ("CTS") line. After these conditions are satisfied, the devices can begin data transmission over the data lines at communication speeds.

SUMMARY OF THE INVENTION

As noted above, wired RS232 applications conduct data communications between a sender and a receiver that are hard wired together. In a wired RS232 connection based application, several lines may be simultaneously used to send signaling information; the signals on each line are detected by the sender and receiver instantaneously. On the other hand, in wireless RS232 communications, instantaneous communication does not occur. Rather, information is transmitted with a delay of ranging from 0.5 to 4 or 5 seconds. Furthermore, in wireless communications, modems can connect to a large number of devices using the call establishment methodology programmed into the modems.

The present invention provides a method and apparatus for using wireless modems in an RS232 mode, that provide (1) logic establishing the sender and receiver and (2) a signaling and data transmission methodology that makes the wireless mode transparent to the applications. The method and apparatus of the present invention allows utilization of wired RS232 based applications transparently on wireless communication systems, and alleviates the delay inherent in wireless communications without impacting the reliability of the system.

The invention provides a wireless point-to-point communications system for reliable and efficient digital data transfers as compared to prior art network interface protocols. In this regard, and in accordance with one embodiment, the invention utilizes a commonly available communications protocol, such as RS232, or other accepted serial standard to encapsulate digital data derived from an instrument, data collector, or other signal acquisition means in a wireless signal carrier. The serial protocol has built-in error correction and flow control. The end-to-end interface is compatible with ordinary devices supporting the protocol. In addition, the cellular communications infrastructure provides a reliable backbone with call switching and routing of the data to its intended destination. The RS-232 data and flow control signal are encapsulated in a CDPD courier supported in existing cellular infrastructures. Since RS-232 is widely accepted and supported by a plurality of data acquisition processing systems, the interface protocol provided is reliable and efficient.

DETAILED DESCRIPTION

Figure 1A:
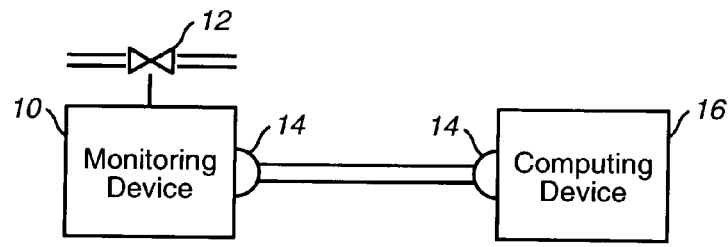
FIG. 1(a) is a schematic illustration of a system utilizing standard, wired RS232 data transmission.

Referring now to FIG. 1(a), a system utilizing standard RS232 data transmission is illustrated. In the illustrated embodiment, a monitoring device 10 retrieves information from a remote device, such as meter 12. The information is normally collected as an analog signal that is converted to a digital format and subsequently transmitted via wired RS232 interfaces 14 to a computing device 16 such as a computer, programmable logic controller or data concentrators/multiplexers for storage and processing.

Figure 1B:
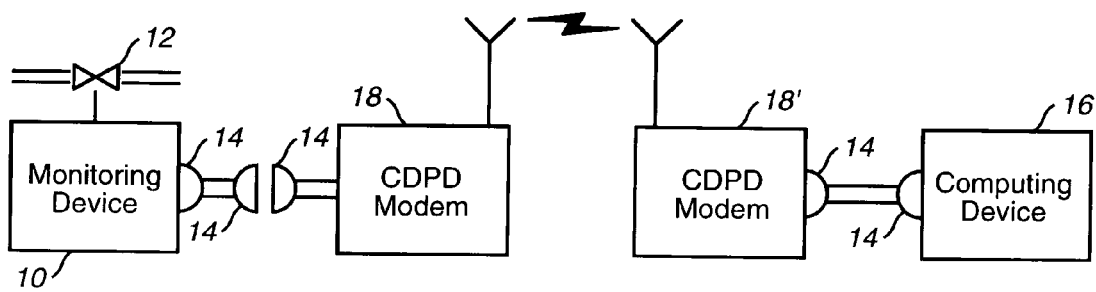
FIG. 1(b) is a schematic illustration of a system employing the wireless data transmission of the present invention.

FIG. 1(b) illustrates a data transmission system utilizing the present invention. Data is retrieved from remote device 12 by monitoring device 10 and transmitted to a CDPD modem 18 via RS232 interfaces 14. CDPD modem 18 transmits the information via cellular radio to a second CDPD modem 18' which, in turn, transmits the information via RS232 interfaces 14 to computing device 16.

Figure 2:
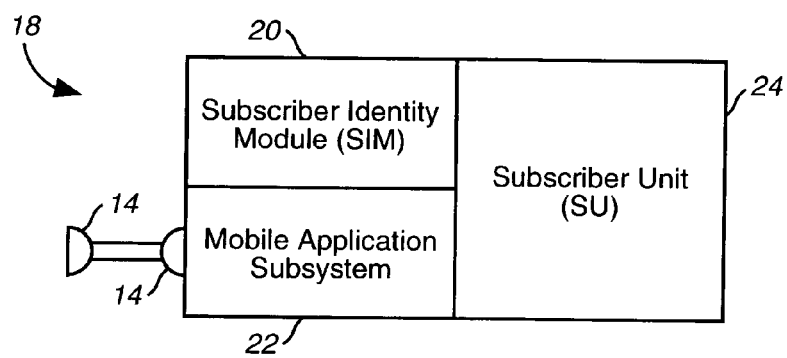
FIG. 2 is an illustration of components of a CDPD utilized in the practice of the present invention.

Referring now to FIG. 2, three components of the CDPD modem 18 are schematically illustrated. The CDPD modem 18 includes a Subscriber Identity Module ("SIM")[1] 20, a Mobile Application Subsystem ("MAS")[2] 22 and a Subscriber Unit ("SU")[2] 24. The mobile application substation 22 interfaces with the end user application and the subscriber unit 24 manages the air interface. In some applications, the SIM is a "smart" card that is inserted or installed in a cellular phone that contains all subscriber-related information. The SIM facilitates communications from a valid cellular telephone because the subscriber data is used to complete telephone communications rather than the internal serial number of the telephone. In one embodiment, the present invention provides an enhancement to the SIM with a standard RS232 interface that increases the distance that digital data can reliably and accurately be transmitted via cellular communications and supports multiple standards without modification.

Figures 3, 4:
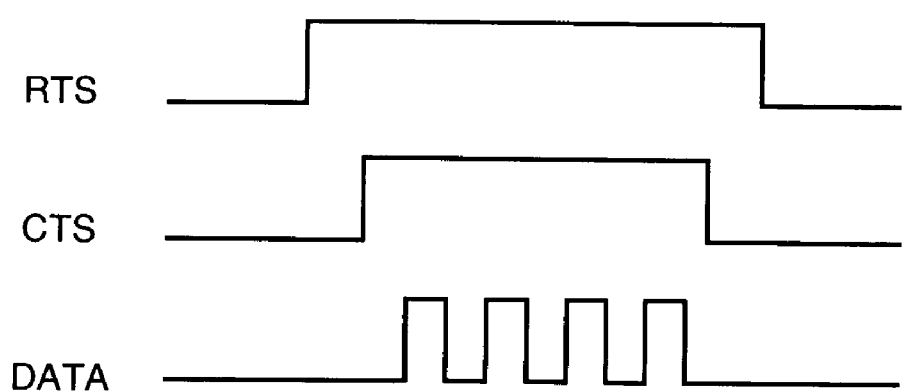
FIG. 3 is a tabular illustration of the configuration of two of the lines of the serial data transmission device of the present invention.
FIG. 4 is an illustration of the timing of the sequence of steps in data transmission utilizing the present invention.

FIG. 3 is a tabular illustration of the configuration of two of the RS232 interface lines or pins utilized to implement data transmission in accordance with the present invention. In order to initiate data communications, the initiating application sets a "high" signal on a first line 26. The program in the modem on the initiation side of the transmission decodes the signal and sets the status of the line in the line entry of the table to "SEND" and the value of the line to "HIGH."

The entire table 26 is transmitted by the modem 18 on the initiating side as one packet of data. When the receiving modem receives the packet, it changes the status of the entry for the first line in the table to "established" on the RS232 interface. The receiving application must then acknowledge the signal by setting the second line 28 "HIGH" in the same sequence, i.e., set the status, and transmit the table as one packet to the receiving modem. The initiating application then sets the status to "ESTABLISHED" on the RS232 interface. When both lines are seen as high and established by the initiating application, the initiating modem starts data transmission.

The data to be transmitted is concatenated to a signaling packet on the initiating side and the packet is transmitted. Since both lines are "HIGH" and "ESTABLISHED," the receiving modem accepts the data. A Cyclical Redundancy Check ("CRC") is used by the receiving modem to confirm the validity of the data. If the data passes the CRC check, it is accepted as valid. Since the wireless modems 18 and 18' provide wireless error correction, duplication of this function is not required. Incorporation of the CRC, however, makes error checking consistent between a wired and wireless application. Through the combination of a minimal logic set and a minimal set of signaling data as set forth above the present invention provides transparency of the wireless link to the application, the same reliability as a wired link for the application and a minimal program size that is important for such applications.

Referring now to FIG. 4 the timing of the sequence of steps in data transmission utilizing the present invention is schematically illustrated. First, the RTS line is pulled "HIGH" on the RS232 interface on the initiating side. Next, the CTS line on the RS232 interface is pulled "HIGH" after receipt of the table 26. After the table 26 has been transmitted back to the initiating modem 18 as described above, data transmission commences. Upon successful completion of data transmission, i.e., when the receiving application detects the end of text in the data, it sets the signal "LOW" on the CTS line, and initiates the same sequence of signaling to de-establish the lines.

Figure 5A:
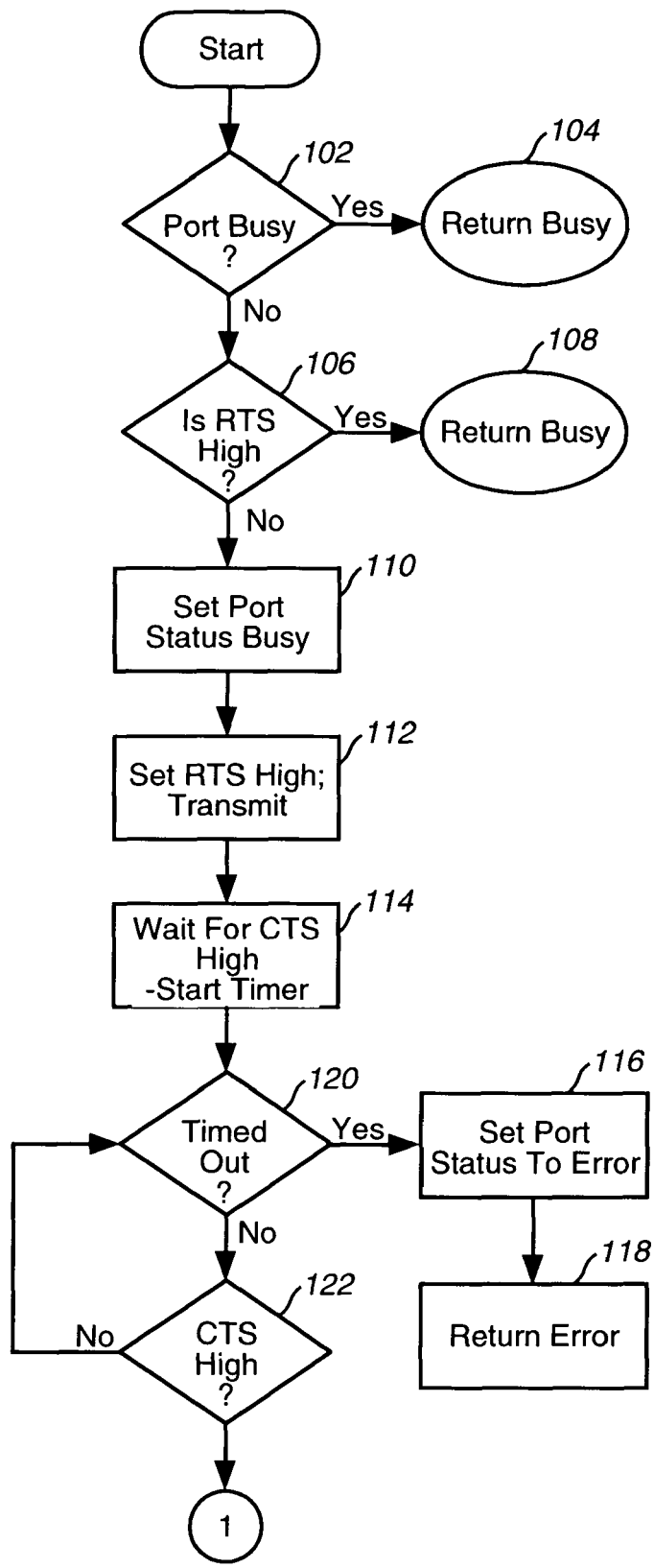
FIGS. 5(a) and 5(b) are a flowchart for the transmitting applications driver utilized in the practice of the present invention.
Figure 5B:
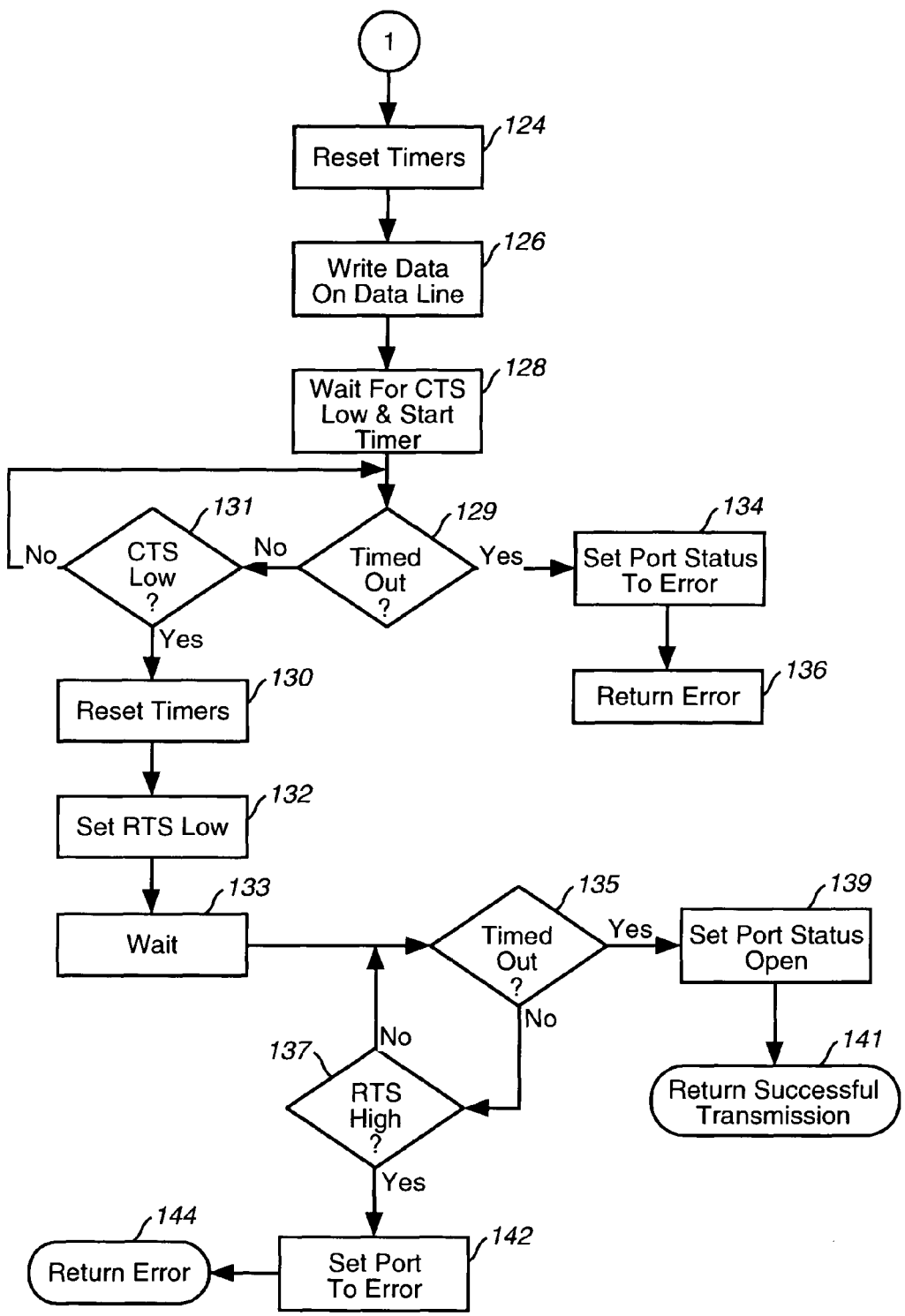

FIGS. 5(a) and 5(b) are a flowchart for the applications driver for the initiating modem. As illustrated, when the application is started the first step is to check the status of the RS232 interface (step 102). If the port is busy, a busy signal is returned to the application (step 104). If the port is not busy, the application checks to determine whether the RTS line is high (step 106). If the RTS line is set high, a busy signal is returned to the application (step 108). If the RTS line is not set high, the port status is set busy (step 110) and the RTS line is set high and table 30 is transmitted as described above (step 112). A timer is initiated (step 114). If the timer times out before receipt of the table 26 from the receiving application, the port status is set to "ERROR" and the error status is returned to the application (steps 116 and 118). If the table 26 is received by the initiating application with the CTS line set high, the timers are reset (step 124) and data transmission is initiated.

When the receiving application detects the end of text in the data transmission it initiates a timer (step 128). If the application receives a CTS "LOW" before the timer times out, the timers are reset (step 130) and the RTS line is set low (step 132). If the timer times out before the CTS "LOW" is received, the port status is set to "ERROR" (step 134) and the error status is returned to the initiating application (step 136). Assuming that the RTS "LOW" signal is confirmed by the initiating device before the timer is timed out, the port status is set open (step 138) and a signal indicating successful transmission is transmitted to the initiating application (step 140). If the RTS low is not confirmed prior to the timer timing out, the port status is set to "ERROR" (step 142) and the error status is transmitted to the initiating application (step 144).

Figure 6A:
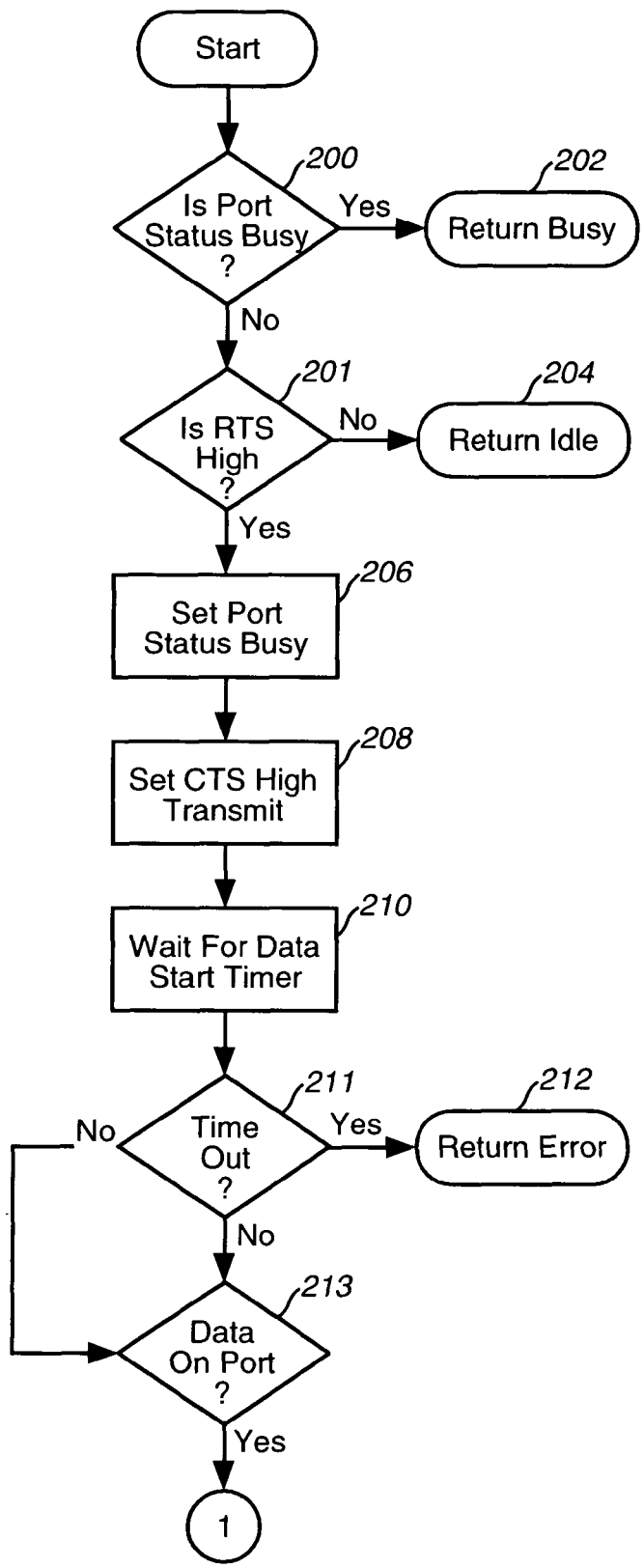
FIGS. 6(a) and 6(b) are a flowchart for the receiving applications driver utilized in the practice of the present invention.
Figure 6B:
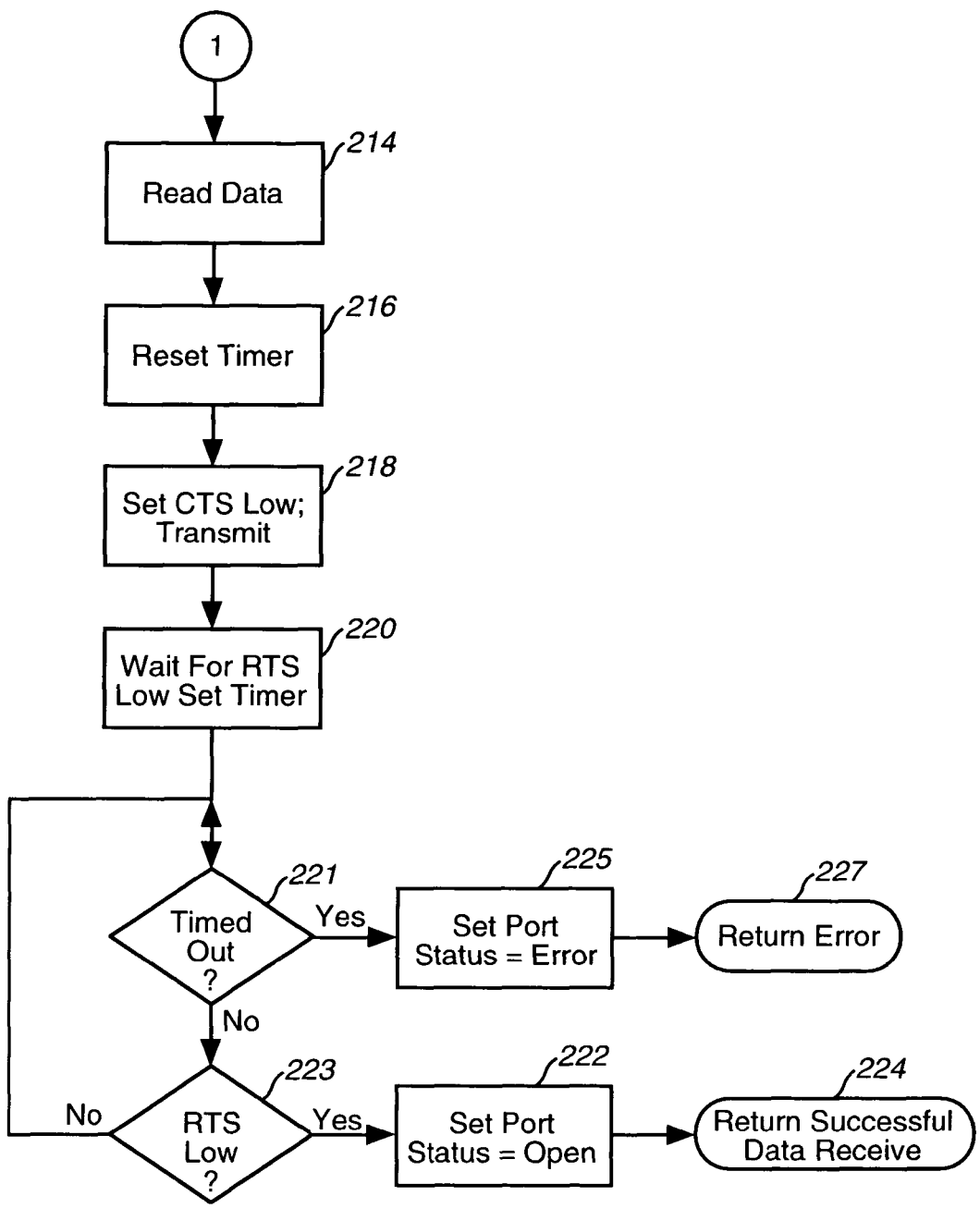

Referring now to FIGS. 6(a) and 6(b) a flowchart for the applications driver for the receiving application is illustrated. After the application is started, the status of the port is checked (step 200) and if the port is busy a return busy signal is returned to the application (step 202). If the RTS line is set low, a return "IDLE" signal is returned to the application (step 204) If the RTS line is set "HIGH" the port status is set "BUSY" (step 206), the CTS line is set high (step 208), and table 26 is transmitted to the initiating application. A timer is initiated (step 210) and if a data transmission is detected on the port before the timer times out, the data is read (step 214) and the timer reset (step 216). If no data transmission is detected on the port before the timer times out, an error signal is returned to the application (step 212).

After the receiving application detects the end of text in the data, it sets the signal in the CTS line "LOW", transmits the data in table 26 (step 218) as described above to the initiating application and sets a timer (step 220). If the receiving application receives confirmation that the RTS line is set low prior to timing out, the port status is set as "OPEN" (step 222) and a successful data receive signal is returned to the initiating application (step 224). If confirmation is not received, and if the timer has timed out, the port status is set to "ERROR" (step 226) and a return error signal is transmitted to the initiating application (step 228).

Figure 7A:
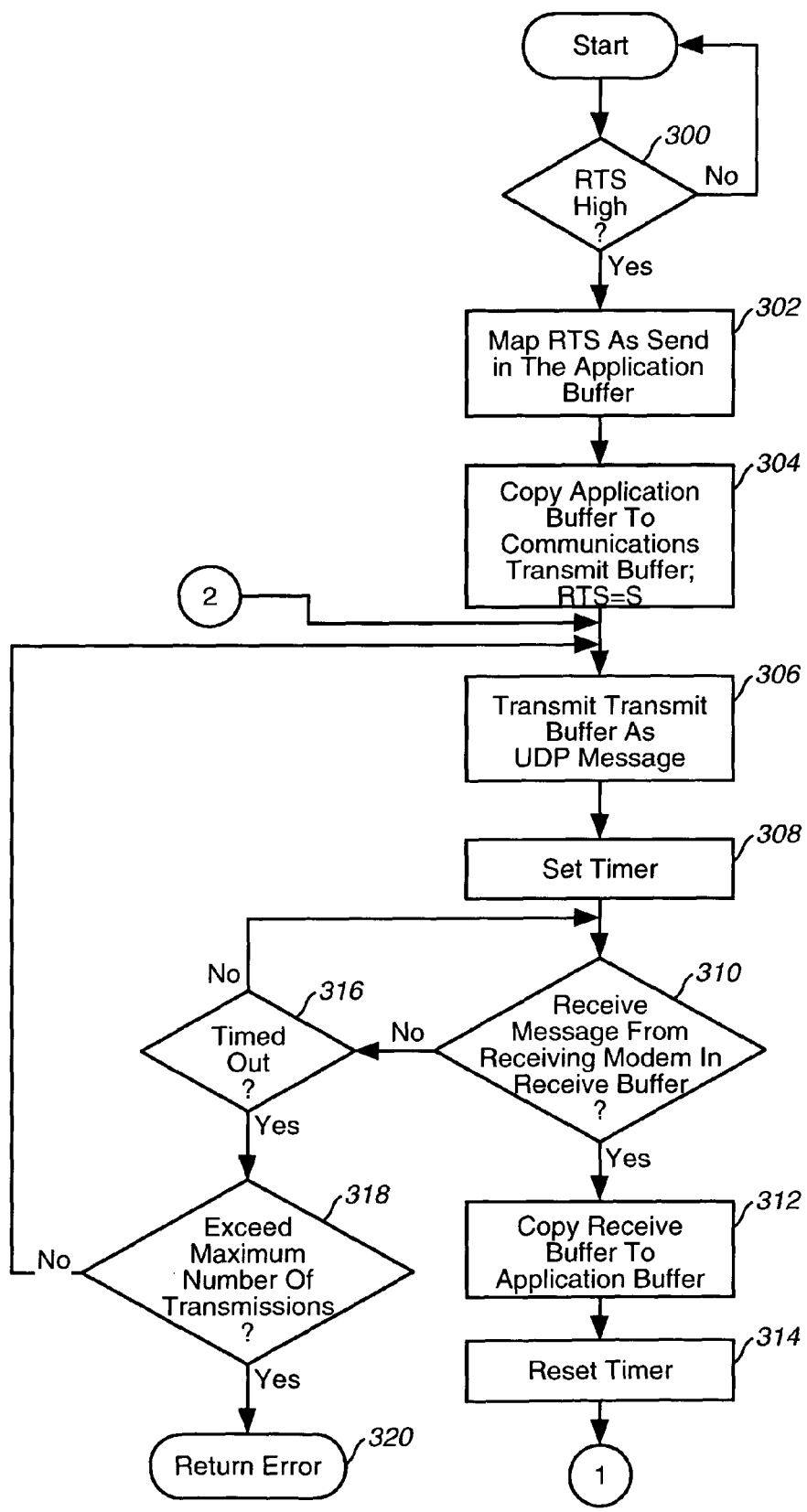
FIGS. 7(a) through 7(e) are a flow chart for control of the initiating CDPD modem as utilized in the practice of the present invention; and, FIGS. 8(a) through 8(d) are a flow chart for control of the receiving CDPD modem as utilized in the practice of the present invention.
Figure 7B:
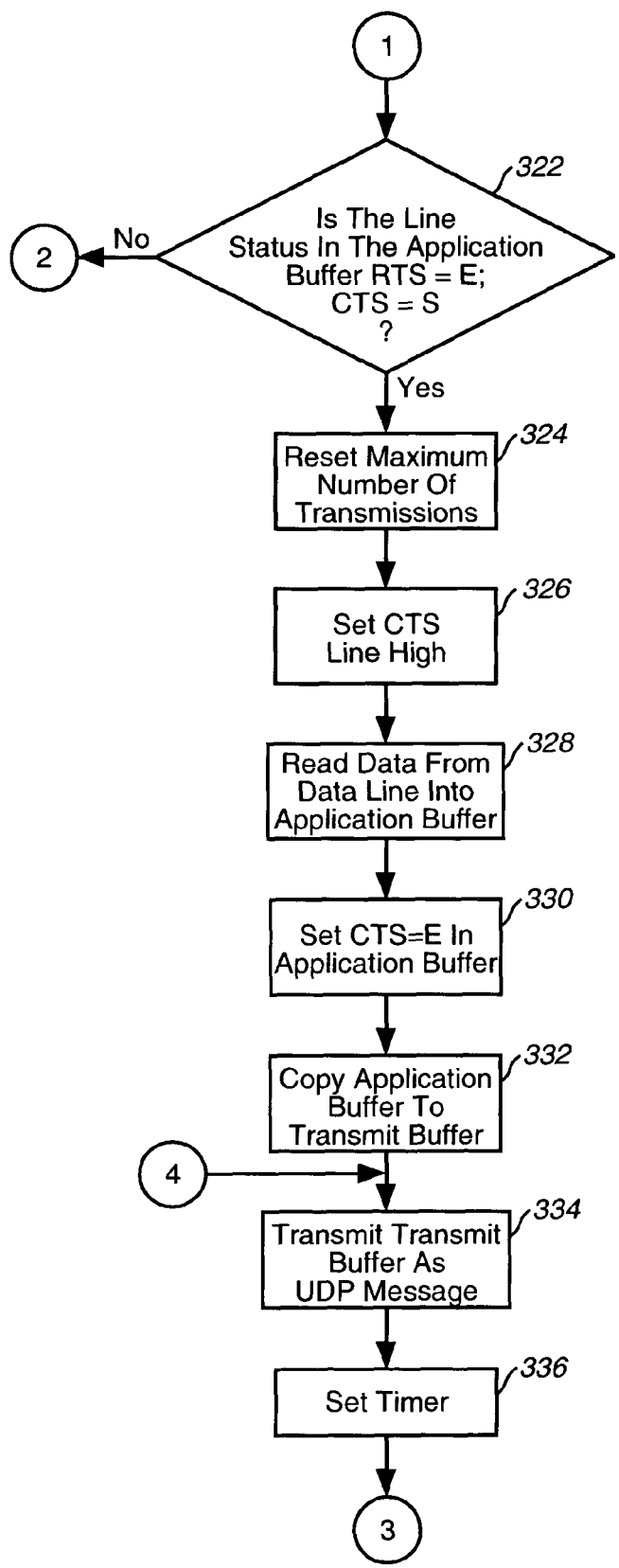
Figure 7C:
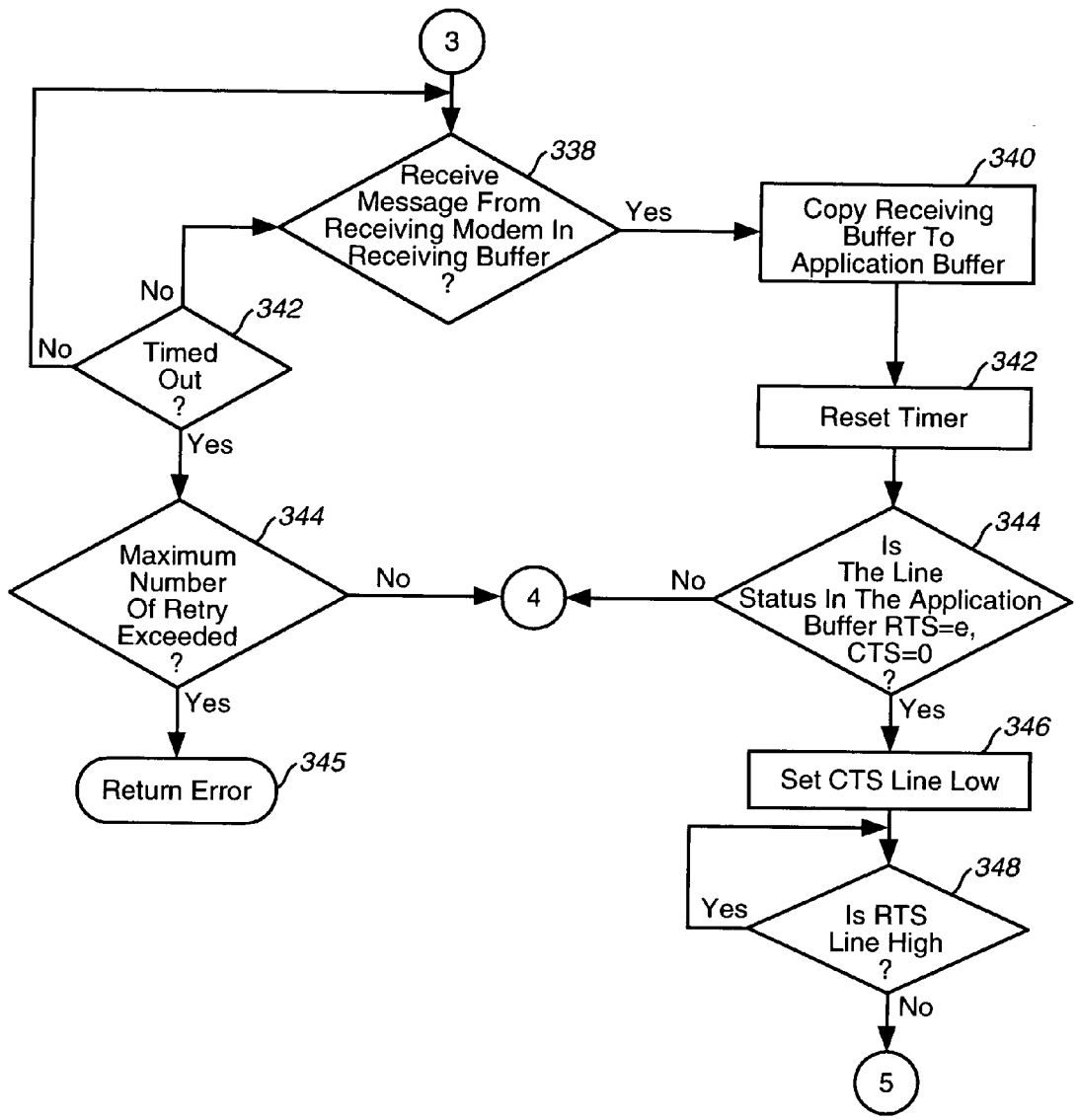
Figure 7D:
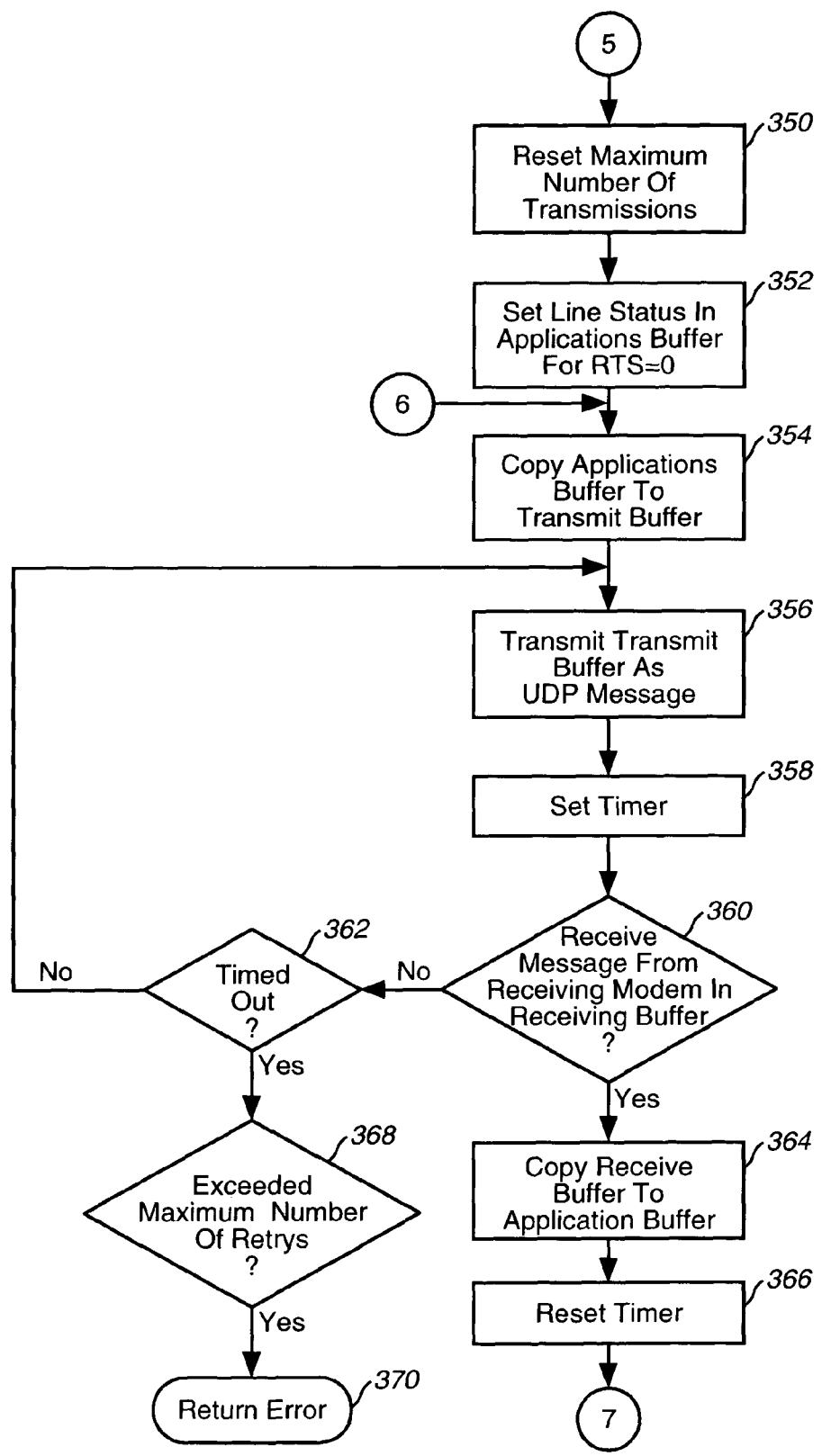
Figure 7E:
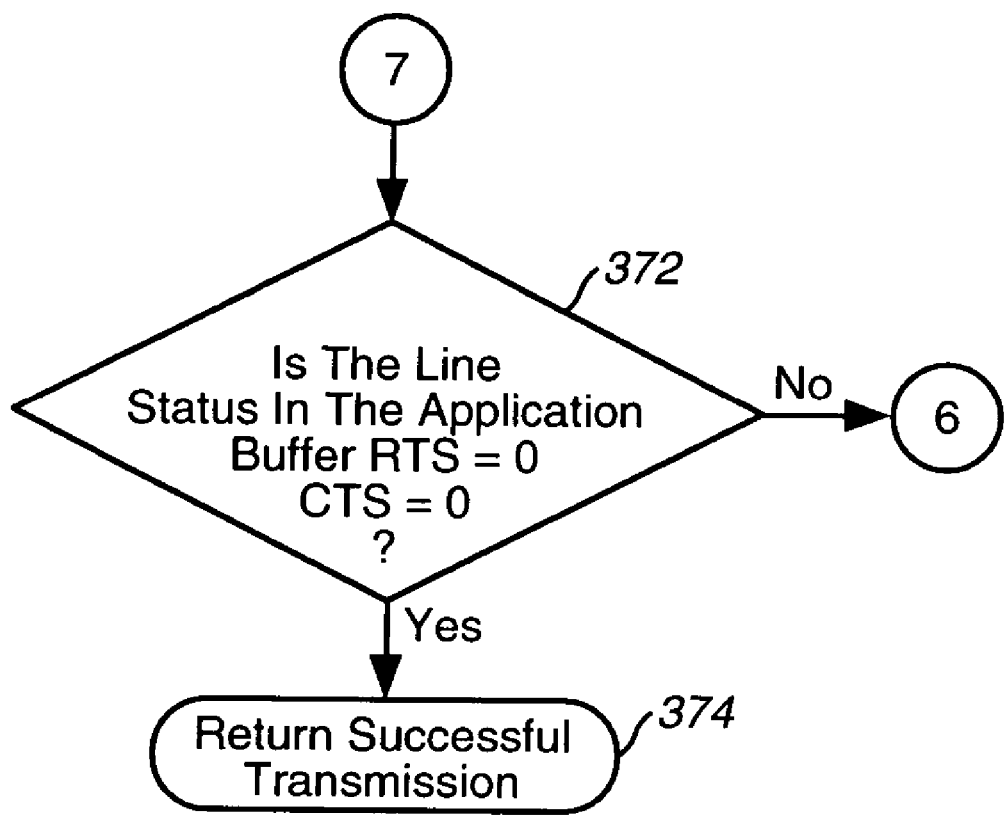
Figure 8A:
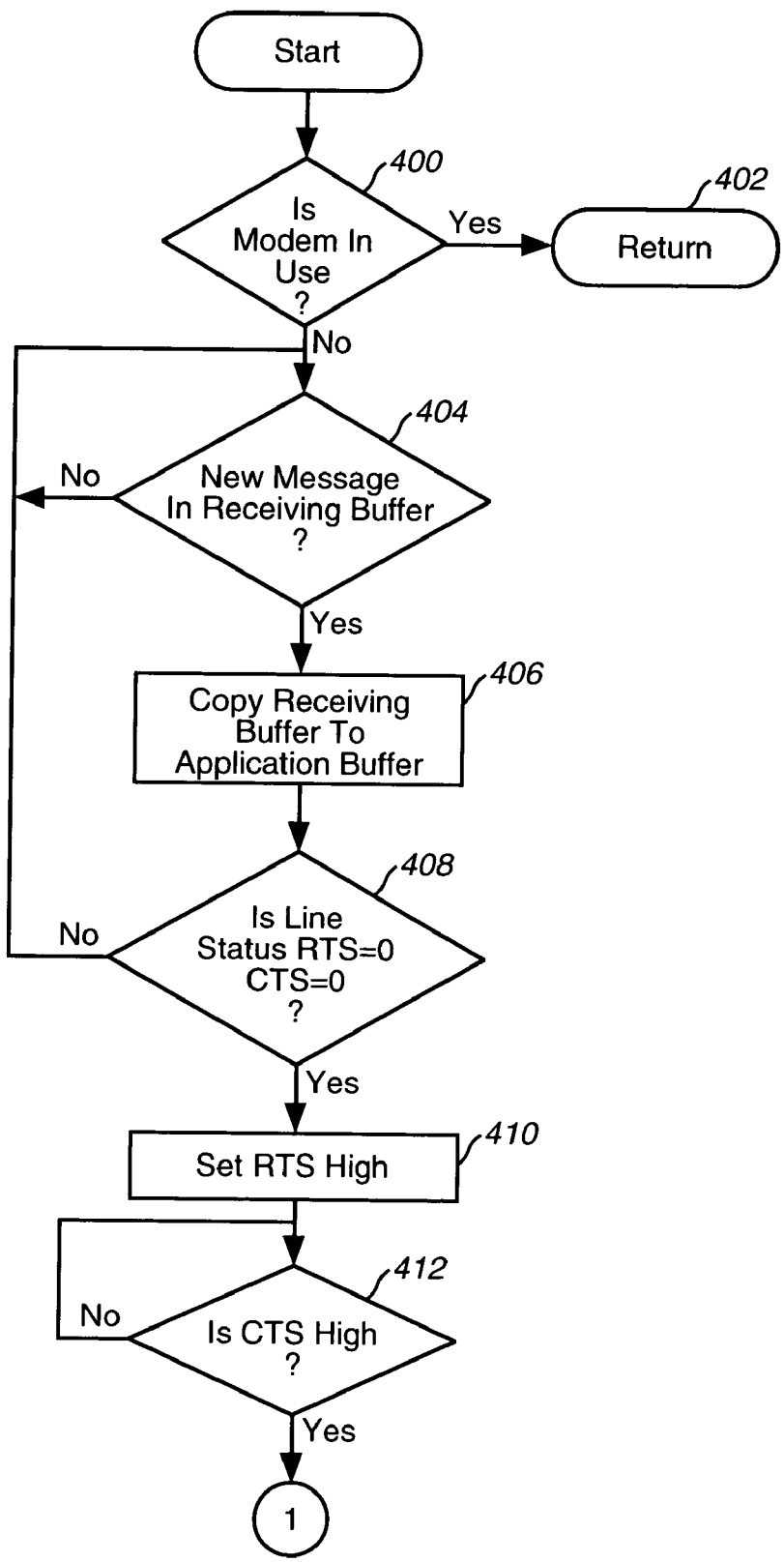
Figure 8B:
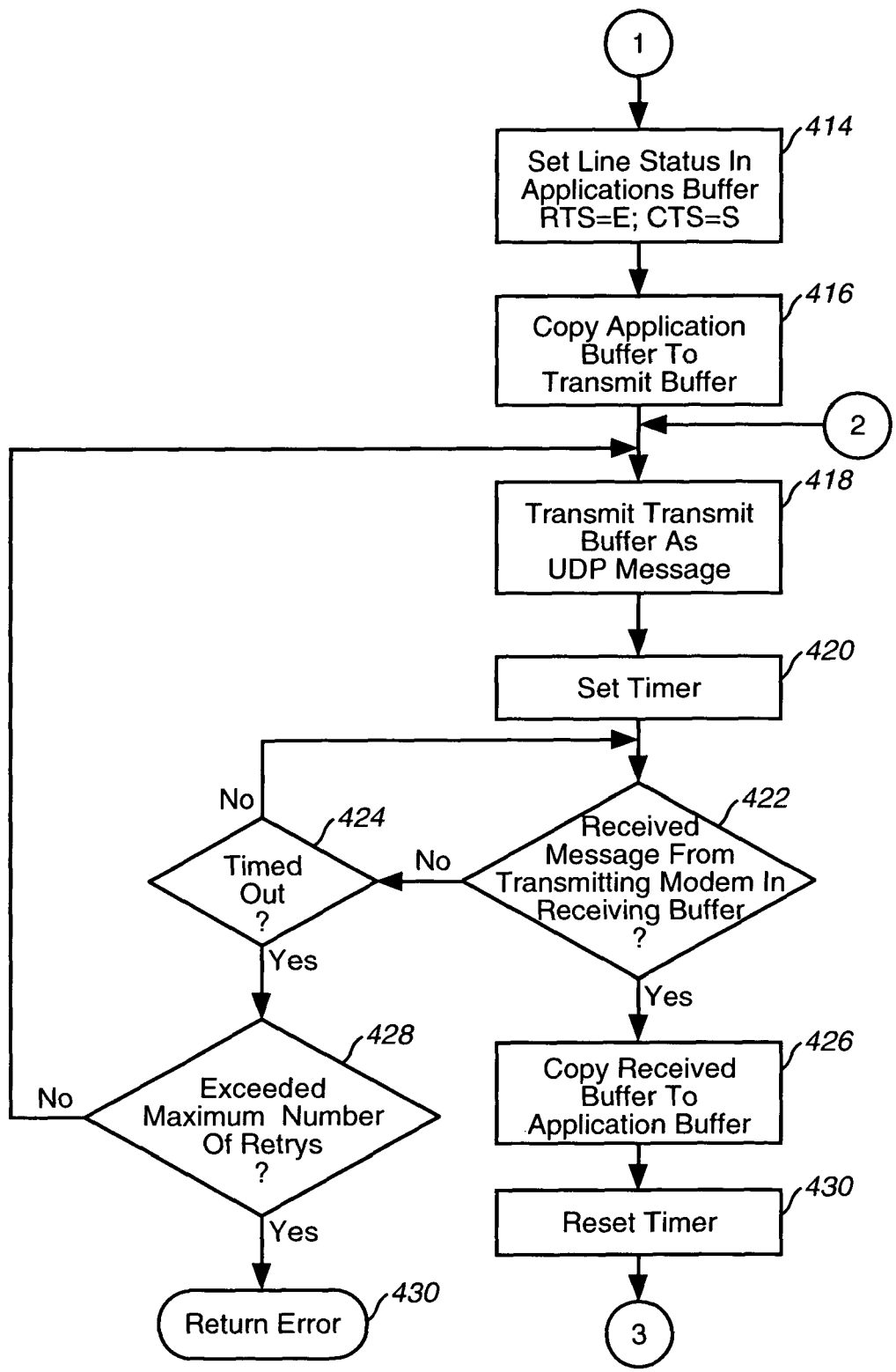
Figure 8C:
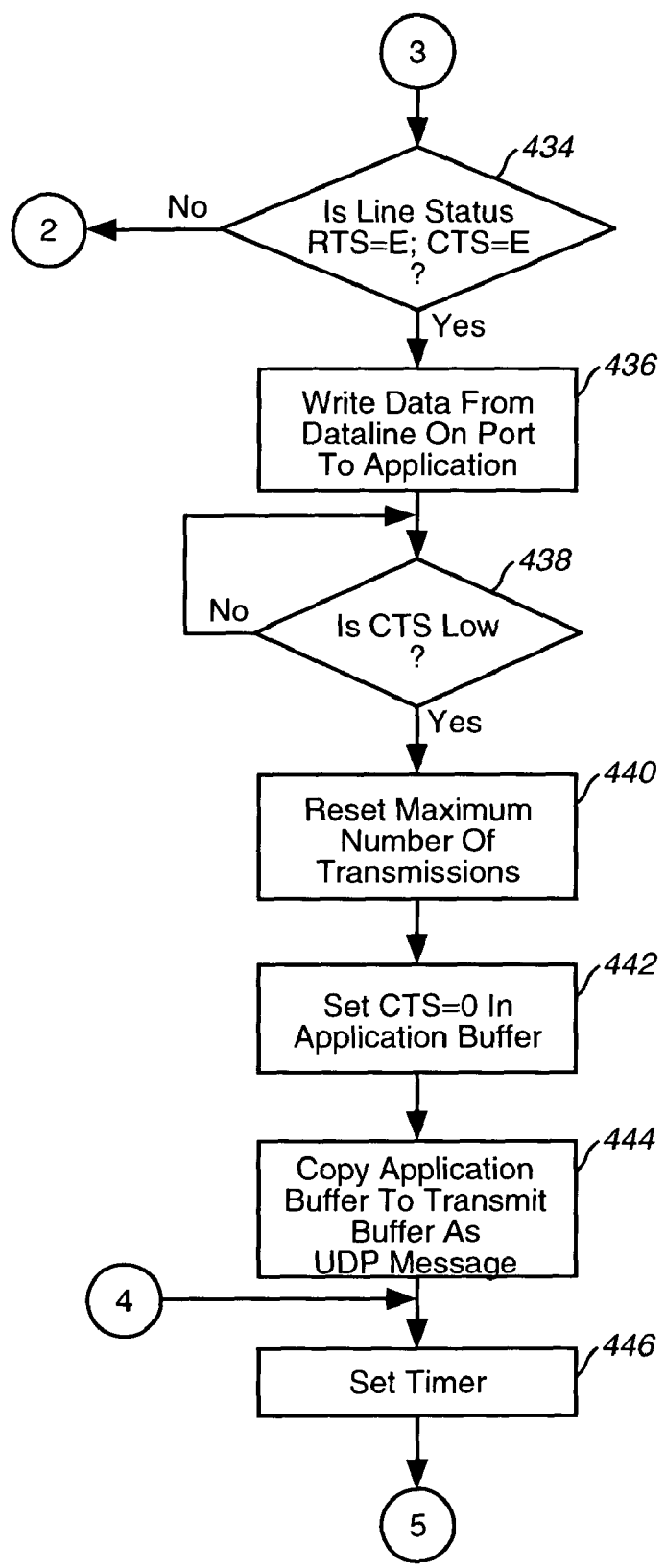
Figure 8D:
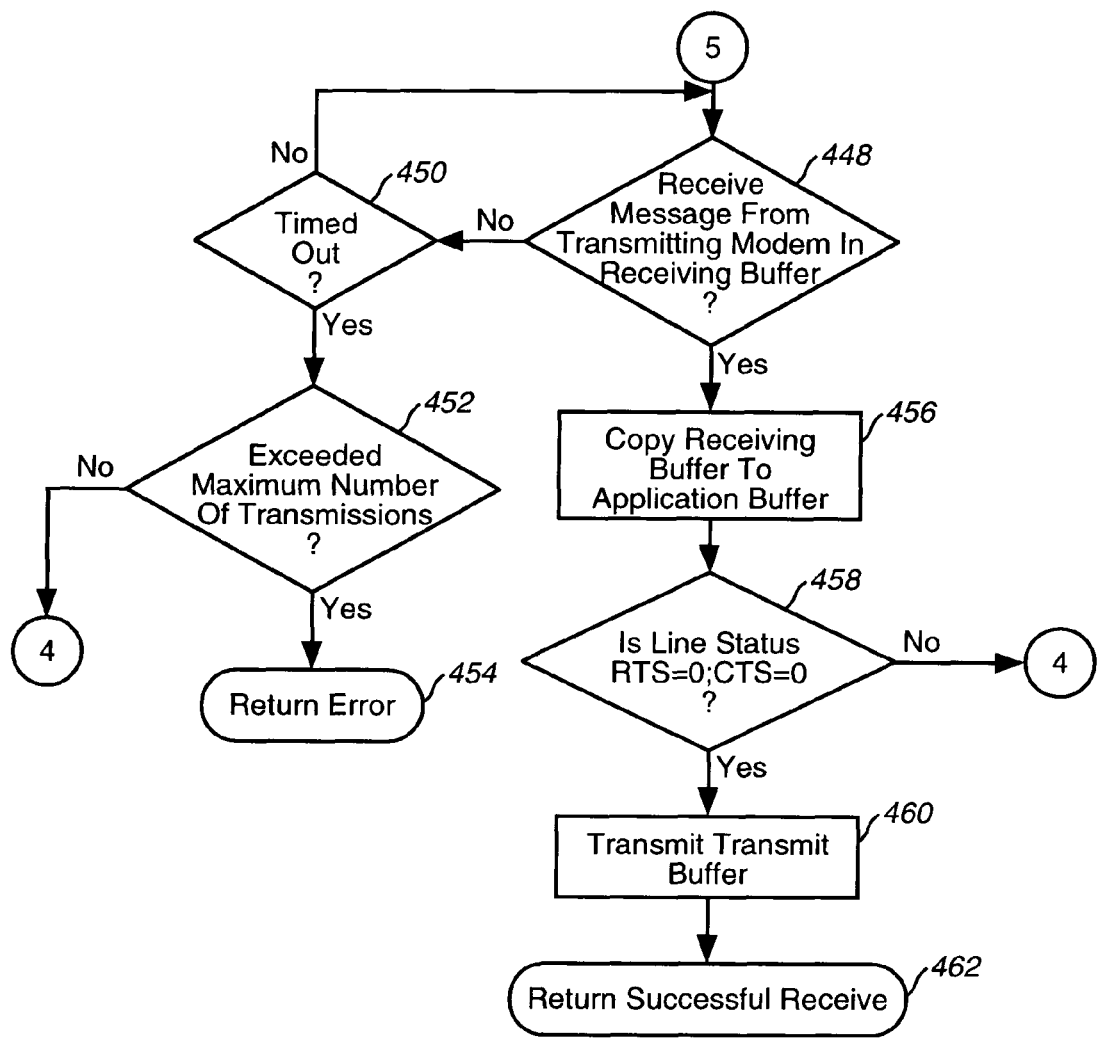

Referring now to FIGS. 7(a), through 7(e) a flow chart for the CDPD modem control for the initiating modem is illustrated. The status of the RTS line is checked (step 300), and if the RTS line is set high the status of the RTS line is mapped as "SEND" in the application buffer (step 302) and the application buffer is copied to the communications transmit buffer (step 304). The transmit buffer is then transmitted to the receiving modem as a UDP ("User Data Protocol") message, (step 306) and a timer is set (step 308). If a message is received from the receiving modem in the receive buffer (step 310), the receive buffer is copied to the application buffer (step 312) and the timer is reset (step 314). If the timer times out prior to the receipt of a message from the receiving modem (step 316) the number of attempted transmissions is compared to a predetermined maximum number of transmissions (step 318). If the number of attempted transmissions exceeds the predetermined maximum an error message is returned to the application (step 320).

After the receive buffer is copied to the application buffer, the status of the RTS and CTS lines in the application buffer is checked (step 322). If the RTS line status is set to "ESTABLISHED" and the CTS line status is set to "SEND", the predetermined number of permissible transmission attempts is reset (step 324) and the CTS line is set high (step 326), otherwise control is returned to step 306. Upon receipt of data, the data is read from the data line into the application buffer (step 328) and the CTS line status is set as "ESTABLISHED" in the application buffer (step 330). The application buffer is copied to the transmit buffer (step 332), transmitted as a UDP message (step 334) and a timer is set (step 336).

If a message is received from the receiving modem in the receiving buffer (step 338), before the timer times out, the contents of the receiving buffer are copied into the applications buffer (step 340). If the timer times out prior to the receipt of a message from the receiving modem (step 342), the number of attempted transmissions are compared to a predetermined maximum number of transmissions (step 344).

If the number of attempted transmissions exceeds the predetermined maximum, an error message is returned to the application, otherwise control is returned to step 334. After the contents of the receiving buffer is copied into the applications buffer (step 340), the timer is reset and the line status in the application buffer are checked for RTS "ESTABLISHED" and CTS "LOW" (step 344). If these conditions are met, the CTS line is set low (step 346). If the line status in the application buffer for RTS is not "ESTABLISHED" or if CTS is not set low, control is returned to step 334.

After the CTS line is set low in step 346, the RTS line is checked for a "HIGH" condition (step 348) and the maximum number of permissible attempted number of attempted transmissions is reset (step 350). If the RTS is "LOW," control is returned to step 348. After the number of permissible attempted transmissions is reset in step 350, the line status for RTS in the applications buffer is set low (step 352). The applications buffer is copied to the transmit buffer (step 354), the transmit buffer is transmitted as a UDP message (step 356) and a timer is set (step 358).

If a message is received from the receiving modem in the receiving buffer (step 360) prior to the timer timing out (step 362), the contents of the receiving buffer are copied into the application buffer (step 364) and the timer is reset (step 366). If the timer times out (step 362) the number of attempted transmissions is compared to the maximum permissible number (step 368). If the number of attempted transmissions exceeds the maximum permissible number, an error message is returned to the application, (step 370); if not, control is returned to step 356.

After the timer is reset in step 366, the line status in the applications buffer is checked for RTS "LOW" and CTS "LOW" (step 372). If these conditions are not met, control is returned to step 354; if the conditions are met, a signal indicating a successful transmission is returned to the application (step 374).

Referring now to FIGS. 8(a) through 8(d), the modem control for the receiving modem is schematically illustrated. The receiving modem checks to determine whether the modem is in use (step 400) and if so, signals a return (step 402). If the modem is not in use, the application checks for a new message in the receive buffer (step 404). If a message is present in the receive buffer, the contents of the receive buffer are copied (step 406) to the applications buffer and the line status is checked for RTS "SEND" and CTS "LOW" (step 408). If these conditions are met, the RTS line is set "HIGH" (step 410) and the status of the CTS line is checked for a "HIGH" status (step 412).

If the line status of the CTS is "HIGH" the line status in the applications buffer is set as RTS "ESTABLISHED" and CTS "SEND" (step 414). The contents of the application buffer are copied to the transmit buffer (step 416) and transmitted to the initiating modem (step 418) as a UDP message. A timer is set (step 420) and the receive buffer is checked for receipt of a message from the transmitting modem (step 422). If a message is received from the transmitting modem before the timer times out (step 424), the message is copied from the receive buffer into the applications buffer (step 426).

At this time, the timer has timed out and the number of attempted transmission has exceeded the predetermined maximum number of allowable attempted transmissions, (step 428), a error signal is returned to the application (step 430). If the timer has not timed out, control is returned to step 422, or if the timer has timed out and the predetermined maximum number of attempted transmissions has not been exceeded, control is returned to step 418.

After the contents of the receiving buffer have been copied into the applications buffer in step 426, the timer is reset (step 432) and the line status is checked for RTS "ESTABLISHED" and CTS "ESTABLISHED" (step 434). Data from the dataline is written to from the dataline on the port to the application (step 436). The status of the CTS is check for "LOW" (step 438) and if this condition is met, the predetermined allowable number of attempted transmissions is reset, (step 440) and the CTS status is set to "low" in the applications buffer, and the contents of the applications buffer is copied to the transmit buffer for transmission as a UDP message (step 444). a timer is set (step 446) and the receive buffer is monitored for receipt of a message from the transmitting modem (step 448). If the timer times out prior to receipt of a message from the transmitting modem, (step 450) the number of attempted transmissions is compared to the predetermined allowable number of attempted transmissions (step 452) and if the maximum allowable number of attempted transmissions is exceeded, an error signal is returned to the application (step 454).

After a message has been received from the transmitting modem, (step 448), a copy of the received buffer is copied to the application buffer, (step 456) and the line status is checked for CTS "LOW" and RTS "LOW" (step 458). If these conditions are met, the contents of the transmit buffer are transmitted (step 460) and a "SUCCESSFUL RECEIVE" message is returned to the application. If the line status conditions are not met, control is returned to step 446.

Through the combination of a minimal logic set and minimal signaling data as set forth above, the present invention provides a transparent wireless link between RS232 interfaces with the same or equivalent reliability as a hard wired link. Further, the present invention provides these features with a minimal program size, a feature that is important in the applications of interest.

While the present invention has been disclosed and discussed in connection with the above-described embodiment, it will be apparent to those skilled in the art that numerous changes, variations and modifications within the spirit and scope of the invention are possible. Accordingly, it is therefore, intended that following claims shall encompass such variations and modifications.

The invention claimed is:

1. A method of transmitting data, comprising:
   receiving data and control information generated from an interface according to a physical layer protocol, the interface being coupled to a data terminal equipment;
   encapsulating the data and control information in a wireless carrier signal; and
   transmitting the wireless carrier signal to a data circuit-terminating equipment, wherein the data circuit-terminating equipment operates according to the physical layer protocol.

2. The method according to claim 1, further comprising:
   receiving another control signal from the interface, wherein the another control signal is encapsulated in the wireless carrier signal.

3. The method according to claim 1, wherein the wireless carrier signal is transmitted according to a wireless communications protocol that supports transmission of the encapsulated data and control information over an overlay network.

4. The method according to claim 3, wherein the overlay network is on top of an analog cellular system.

5. The method according to claim 3, wherein the wireless communications protocol includes Cellular Digital Packet Data.

6. The method according to claim 1, wherein the physical layer protocol specifies electrical characteristics between the data terminating equipment and the data circuit-terminating equipment.

7. The method according to claim 1, wherein the physical layer protocol includes RS232.

8. A method of transmitting data, comprising:
   receiving a carrier signal encapsulating data and a plurality of control signals from a data circuit-terminating equipment, wherein the data and a plurality of control signals are generated according to a physical layer protocol; and
   outputting the data and the control signals to an interface coupled to data terminal equipment configured to operate according to the physical layer protocol.

9. The method according to claim 8, wherein the carrier signal is received according to a wireless communications protocol that supports transmission of the encapsulated data and the control signals over an overlay network.

10. The method according to claim 9, wherein the overlay network is on top of an analog cellular system.

11. The method according to claim 9, wherein the wireless communications protocol includes Cellular Digital Packet Data.

12. The method according to claim 8, wherein the physical layer protocol specifies electrical characteristics between the data terminating equipment and the data circuit-terminating equipment.

13. The method according to claim 8, wherein the physical layer protocol includes RS232.

14. A device for transmitting data, comprising:
    an interface configured to receive data and control information from a data terminal equipment according to a physical layer protocol;
    a processor configured to encapsulate the data and control information in a wireless carrier signal; and
    an air interface configured to transmit the wireless carrier signal to a data circuit-terminating equipment, wherein the data circuit-terminating equipment operates according to the physical layer protocol.

15. The device according to claim 14, wherein the interface receives another control signal, and the processor encapsulates the other control signal in the wireless carrier signal.

16. The device according to claim 14, wherein the air interface operates according to a wireless communications protocol that supports transmission of the encapsulated data and control information over an overlay network.

17. The device according to claim 16, wherein the overlay network is on top of an analog cellular system.

18. The device according to claim 16, wherein the wireless communications protocol includes Cellular Digital Packet Data.

19. The device according to claim 14, wherein the physical layer protocol specifies electrical characteristics between the data terminating equipment and the data circuit-terminating equipment.

20. The device according to claim 14, wherein the physical layer protocol includes RS232.

21. A device of transmitting data, comprising:
    an air interface configured to receive a carrier signal encapsulating data and a plurality of control signals from a data circuit-terminating equipment, wherein the data and a plurality of control signals are generated according to a physical layer protocol;
    a processor configured to output the data and the control signals; and
    an interface coupled to a data terminal equipment that is configured to operate according to the physical layer protocol, the interface forwarding the data and the control signals to the data terminal equipment.

22. The device according to claim 21, wherein the air interface operates according to a wireless communications protocol that supports transmission of the encapsulated data and the control signals over an overlay network.

23. The device according to claim 22, wherein the overlay network is on top of an analog cellular system.

24. The device according to claim 22, wherein the wireless communications protocol includes Cellular Digital Packet Data.

25. The device according to claim 21, wherein the physical layer protocol specifies electrical characteristics between the data terminating equipment and the data circuit-terminating equipment.

26. The device according to claim 21, wherein the physical layer protocol includes RS232.

27. A method of transmitting data, comprising:
    retrieving data and control information from a remote device and transmitting the retrieved data and control information to a first Cellular Digital Packet Data (CDPD) modem via a first RS232 interface;
    transmitting the retrieved data and control information from the first CDPD modem, via cellular radio, to a second CDPD modem; and
    transmitting the retrieved data and control information from the second CDPD modem, via a second RS232 interface, to a computing device.

* * * * *